Patented May 8, 1951

2,552,235

UNITED STATES PATENT OFFICE 2,552,235

INSECTICIDAL COMPOSITIONS

Friar M. Thompson, Jr., Wilmington, Del., assignor to Hercules Powder Company, Wilmington, Del., a corporation of Delaware No Drawing. Application October 23, 1944,
Serial No. 560,048

8 Claims. (Cl. 167—30)

This invention relates to improved insecticidal compositions and more particularly to insecticidal compositions comprising combinations of organic halogen compounds and terpene thiocyanoacylates.

An insecticidal composition, to be of value, must have a high paralyzing power and a high killing power and at the same time should not be harmful or irritating to warm-blooded animals. The insecticidal compositions of the prior art contain as the active insecticidal agents, compounds that are deficient either in paralyzing power or killing power or both. These insecticidal compositions, relying on such deficient agents, must, therefore, contain the toxic agent in a relatively high concentration in order for the composition to be effective.

It is well known that 1,1,1-trichloro-2,2-bis(p-chlorophenyl)ethane has a good killing power. However, the paralyzing action of this agent is very poor and, therefore, a more concentrated solution must be used in order to get the necessary knockdown. The disadvantage of using more concentrated solutions of this agent is in the increased cost of the insecticidal composition due to the greater quantity of the expensive insecticidal agent used, and even more important is the fact that this agent is toxic to warm-blooded animals. Therefore, it is desirable to use only dilute solutions of it.

Now in accordance with this invention it has been found that insecticidal compositions, having such an unexpectedly powerful killing power and paralyzing action that even very dilute solutions may be used effectively, may be produced by combining a 1,1,1-trihalo-2,2-diphenylethane compound and a terpene thiocyanoacylate.

The following examples are representative of the results obtained with solutions of such combined toxicants.

EXAMPLE I

The standard Peet-Grady test on flies was made on solutions of isobornyl thiocyanoacetate and 1,1,1-trichloro-2,2-bis(p-chlorophenyl)ethane (DDT) in Deo-Base. The results of these tests are given in the following table:

*Peet-Grady tests on flies*

| Composition of Insecticide | | | Per Cent Knockdown 10 min. | Per Cent Kill | | OTI Diff. | Grade |
|---|---|---|---|---|---|---|---|
| Isobornyl thiocyanoacetate | DDT | Deo-Base | | 24 hr. | 48 hr. | | |
| 0.8 | 0.2 | 99.0 | 100 | 100 | 100 | +56 | AA |
| 1.6 | 0.4 | 98.0 | 100 | 100 | 100 | +56 | AA |
| 2.4 | 0.6 | 97.0 | 100 | 100 | 100 | +56 | AA |

EXAMPLE II

The following test of the toxicity on flies was made on solutions of isobornyl thiocyanoacetate and 1,1,1-trichloro-2,2-bis(p-chlorophenyl)ethane (DDT) and combinations of these toxicants in Deo-Base.

Approximately 100 five-day old flies (*Musca domestica*) were placed in a bell jar and a predetermined quantity of the insecticide to be tested was atomized into the bell jar. The quantity of insecticide used was equal to the amount of a standard insecticide which was necessary to give a 68–72% kill and must be within the limits of 0.15 to 0.25 cc. After spraying the insecticide into the chamber, the number of flies down in 2, 5 and 10 minutes were counted. The flies which were knocked down were placed in an observation cage containing a wad of cotton wet with a concentrated sugar solution. At the end of 24 hours the number of dead and moribund flies were counted. All tests were carried out at 80°–90° F. and 50–70% relative humidity.

The results of these tests are given in the following table. The data on each of the solutions is an average of a series of tests made on each solution.

*Bell jar tests on flies*

| Composition of Insecticide | | | Per Cent Knockdown | | | Per Cent Kill 24 hr. |
|---|---|---|---|---|---|---|
| Isobornyl thiocyanoacetate | DDT | Deo-Base | 2 min. | 5 min. | 10 min. | |
| 1.6 | ---- | 98.4 | 0 | 17 | 90 | 6.3 |
| ---- | 0.4 | 99.6 | 0 | 0 | 0 | 100 |
| 1.6 | 0.4 | 98.0 | 10 | 32 | 100 | 100 |

EXAMPLE III

The standard Peet-Grady test was performed on mosquitoes with Deo-Base solutions of isobornyl thiocyanoacetate and 1,1,1-trichlor-2,2-bis(p-chlorophenyl)ethane. The results of these tests are given in the following table:

*Peet-Grady tests on mosquitoes*

| Composition of Insecticide | | | Knock-down 2½ min. | Per Cent Kill 24 hr. |
|---|---|---|---|---|
| Isobornyl Thiocyanoacetate | DDT | Deo-Base | | |
| 0.3 | 0.2 | 99.5 | 70 | 98 |
| 0.4 | 0.1 | 99.5 | 82 | 94 |
| 0.6 | 0.4 | 99.0 | 86 | 99 |
| 0.8 | 0.2 | 99.0 | 92 | 96 |

EXAMPLE IV

A field test was made on Deo-Base solutions of isobornyl thiocyanoacetate and 1,1,1-trichloro-2,2-bis(p-chlorophenyl)ethane and combinations of these toxicants in order to determine the effect of the sprays on mosquitoes under the ordinary conditions of usage. Test cages of mosquitoes were hung on the wall of a shed which was open on one side. Six and one-half milliliters of the solutions were then atomized at the wall under a pressure of 20 pounds. The atomizer was held about 3 feet from the wall; the wall area covered in 12 seconds being about 48 square feet in area. The results of this field test are given in the following table:

*Field tests on mosquitoes*

| Composition of Insecticide | | | Per Cent Kill 24 hr. |
|---|---|---|---|
| Isobornyl Thiocyanoacetate | DDT | Deo-Base | |
| 0.9 | | 99.1 | 11 |
| | 0.1 | 99.9 | 47 |
| 0.9 | 0.1 | 99.0 | 72 |

EXAMPLE V

The field test on mosquitoes described in Example IV was repeated using different concentrations of the toxicants and comparing them to pyrethrum as a standard mosquito toxicant. The results obtained are given in the following table:

*Field tests on mosquitoes*

| Composition of Insecticide | | | Knock-down 5 min. | Per Cent Kill 24 hr. |
|---|---|---|---|---|
| Isobornyl thiocyanoacetate | DDT | Deo-Base | | |
| 0.9 | 0.6 | 98.5 | 84 | 98 |
| 1.2 | 0.3 | 98.5 | 86 | 94 |
| Standard Test 1.5% Pyrethrol 20 | | 98.5 | 88 | 73 |

The kill obtained with the combined halogen compound and terpene thiocyanoacylate was much greater than the standard toxicant and shows this combined toxicant to be very potent under the rigorous exposure to winds, etc.

Although 1,1,1-trichloro-2,2-bis(dichlorophenyl)ethane was used in the above examples, a similar behavior is obtained when any other 1,1,1-trihalo-2,2-diphenylethane compound is used. The term 1,1,1-trihalo-2,2-diphenylethane compound is used to describe a compound of the general formula $CX_3CHRR'$, in which X represents a halogen atom and R and R' represent phenyl groups or substituted phenyl groups. Typical examples of such compounds which are operable and effective in the combined insecticide composition are: 1,1,1-tribromo-2,2-bis(p-chlorophenyl)ethane, 1,1,1-trichloro-2,2-diphenylethane, 1-bromo-1,1-dichloro-2,2-bis(p-chlorophenyl)ethane, 1,1,1-trichloro-2,2-di-p-tolylethane, 1,1,1-trichloro-2,2-bis(dichlorophenyl)ethane, 1,1,1-trichloro-2,2-bis(nitrophenyl)-ethane, etc.

In place of the isobornyl thiocyanoacetate used in the examples, other terpene thiocyanoacylates may be used with similar results, for example, thiocyano fatty acid esters of acyclic terpene alcohols, such as geraniol, ocimenol, linalool and rhodinol, monocyclic terpene alcohols, such as terpineol, terpinenol, dihydrocarveol, dihydroterpineol, menthol, carvomenthol, terpin, terpene mono- and di-carbinols, and menthene di-, tri- and tetrols and bicyclic terpene alcohols, such as borneol, isoborneol, fenchyl alcohol and isofenchyl alcohol. Typical of such esters are: geranyl thiocyanoacetate, menthyl thiocyanoacetates, isobornyl thiocyanoacetate, isobornyl alpha-thiocyanopropionate, fenchyl thiocyanoacetate, bornyl thiocyanoacetate, bornyl alpha-thiocyanobutyrate, fenchyl beta-thiocyanopropionate, 1,8-menthanediol-bis(thiocyanoacetate), etc.

The 1,1,1-trihalo-2,2-diphenylethane compound is soluble in the terpene thiocyanoacylate and the concentrate so produced may be diluted with any convenient solvent. The preferred solvents are petroleum hydrocarbons such as kerosene and Deo-Base. However, other diluents may be used. For example, the insecticidal compositions of this invention may be used in the form of a dust, in which case they may be placed on a diluent or carrier such as powdered carbon, kieselguhr, bentonite, etc., or, if desired, they may be used in the form of an aqueous dispersion.

As may be seen in the foregoing examples, very dilute solutions of the combined toxicants are effective, both as to knockdown and as to killing power. The data of Example I shows how a solution containing only 0.2% of 1,1,1-trichloro-2,2-bis(p-chlorophenyl)ethane and 0.8% isobornyl thiocyanoacetate completely knocks down and kills the flies when sprayed in the Peet-Grady chamber. The data of Example II illustrates the synergistic effect obtained with the combination of terpene thiocyanoacylate and DDT. While the kill of the DDT alone is acceptable, the knockdown of neither component alone is sufficient to pass the requirements of a standard fly spray. However, the knockdown obtained with the combination passes such a requirement and is much greater than a mere additive effect. Synergism is also seen in Example IV where a field test was made on mosquitoes. In this case the kill of either toxicant alone or added together was far below that shown by the mutually acting composition. Not only is the effect of the combined toxicant greater than would be expected, but these are very low concentrations of toxicant to give the high paralyzing and killing powers obtained.

Pyrethrum is known to be one of the best toxicants for mosquitoes. However, the supply of this material is very limited. Now it has been found that the insecticidal compositions of this invention not only equal the knockdown but have a kill greater than that of a pyrethrum spray of the same concentration as is shown in the field test made on mosquitoes in Example V. This is a particularly outstanding result in view of the rigorous exposure to winds, etc., under the conditions of the test.

The unexpectedly high paralyzing and killing powers of the insecticidal compositions of this invention make it possible and practical to use very dilute solutions of the combined toxicant. As a result, the irritating properties so frequently prevalent in insecticidal compositions are greatly minimized. The combined toxicant also has the advantage of reducing the amount of the halogen compound, such as 1,1,1-trichloro-2,2-bis(p-chlorophenyl)ethane, which is toxic to warm-blooded animals and the use of which would, therefore, be considerably restricted in more concentrated solutions.

The concentration of the combined toxic agents in petroleum hydrocarbons may be varied from about 0.1% to about 5%, and is preferably about 0.5% to about 3.0%. If desired, however, concentrations higher than 5% may be used. The ratio of the 1,1,1-trihalo-2,2-diphenylethane compound to the terpene thiocyanoacylate compound in the insecticidal composition may vary from 1 to 9 to 1 to 1 and is preferably from 1 to 5 to 1 to 1.5.

The insecticidal compositions of this invention are useful in combating flies, mosquitoes, bed bugs, roaches, beetles and many other pests.

What I claim and desire to protect by Letters Patent is:

1. An insecticidal composition comprising 1,1,1 - trichloro - 2,2 - bis(p-chlorophenyl)ethane and a terpene thiocyanoacylate which are present in the composition in the ratio of at least 1 to 9.

2. An insecticidal composition comprising 1,1,1 - trichloro - 2,2 - bis(p-chlorophenyl)ethane and a fenchyl thiocyanoacylate which are present in the composition in the ratio of at least 1 to 9.

3. An insecticidal composition comprising 1,1,1 - trichloro - 2,2 - bis(p-chlorophenyl)ethane and an isobornyl thiocyanoacylate which are present in the composition in the ratio of at least 1 to 9.

4. An insecticidal composition comprising 1,1,1 - trichloro - 2,2 - bis(p-chlorophenyl)ethane and a terpinyl thiocyanoacylate which are present in the composition in the ratio of at least 1 to 9.

5. An insecticidal composition comprising 1,1,1 - trichloro - 2,2 - bis(p-chlorophenyl)ethane and fenchyl thiocyanoacetate which are present in the composition in the ratio of at least 1 to 9.

6. An insecticidal composition comprising 1,1,1 - trichloro - 2,2 - bis(p-chlorophenyl)ethane and isobornyl thiocyanoacetate which are present in the composition in the ratio of at least 1 to 9.

7. An insecticidal composition comprising 1,1,1 - trichloro - 2,2 - bis(p-chlorophenyl)ethane and terpinyl thiocyanoacetate which are present in the composition in the ratio of at least 1 to 9.

8. An insecticidal composition comprising 1,1,1 - trichloro - 2,2 - bis(p-chlorophenyl)ethane and a cyclic terpene thiocyanoacylate which are present in the composition in the ratio of at least 1 to 9.

FRIAR M. THOMPSON, JR.

REFERENCES CITED

The following references are of record in the file of this patent:

UNITED STATES PATENTS

| Number | Name | Date |
| --- | --- | --- |
| 2,209,184 | Borglin | July 23, 1940 |
| 2,217,612 | Borglin | Oct. 8, 1940 |
| 2,329,074 | Muller | Sept. 7, 1943 |
| 2,396,054 | McKim | Mar. 5, 1946 |

OTHER REFERENCES

Annand et al., Jr. of Economic Entomology, vol. 37, page 137, No. 1, February 1944, Article by Gersdorff et al.

Murphy et al., Jr. Economic Entomology, February 1932, pages 123 and 125.

Murphy et al., Ind. and Eng. Chem., v. 28, September 1936, pages 1117, 1118.